INVENTOR
R. L. BRASS
BY M L Rackman
ATTORNEY

DATA PROCESSOR AND METHOD FOR OPERATION THEREOF

Filed Aug. 25, 1965

United States Patent Office 3,416,138

Patented Dec. 10, 1968

3,416,138

DATA PROCESSOR AND METHOD FOR OPERATION THEREOF

Robert L. Brass, Colts Neck, N.J., assignor to Bell Telephone Laboratories, Incorporated, New York, N.Y., a corporation of New York Filed Aug. 25, 1965, Ser. No. 482,564
7 Claims. (Cl. 340—172.5)

ABSTRACT OF THE DISCLOSURE

A stored program data processor having a memory unit for storing data words and instructions is disclosed. In the operation of the data processor it is from time to time necessary to store groups of data words in various locations in the memory and periodically to process such stored data. However, not all the locations will always have had data stored therein at the beginning of the period allocated for processing such data. Means are provided in the data processor for selectively changing the operation code of each instruction in a series of instructions consequently stored in the memory unit of the data processor. Each such instruction includes a transfer address designating a particular location allocated to the storage of data. When data is initially entered in such location the operation code of its corresponding instruction in the consecutive list is made into a transfer code. When all of the data in any of the locations has been completely processed, its corresponding operation code in the consecutive list is changed into a no-operation code. This permits the consecutive list of instructions to be rapidly scanned for allocated locations having data required to be processed and assures that only such locations will actually be accessed.

Figure 1:
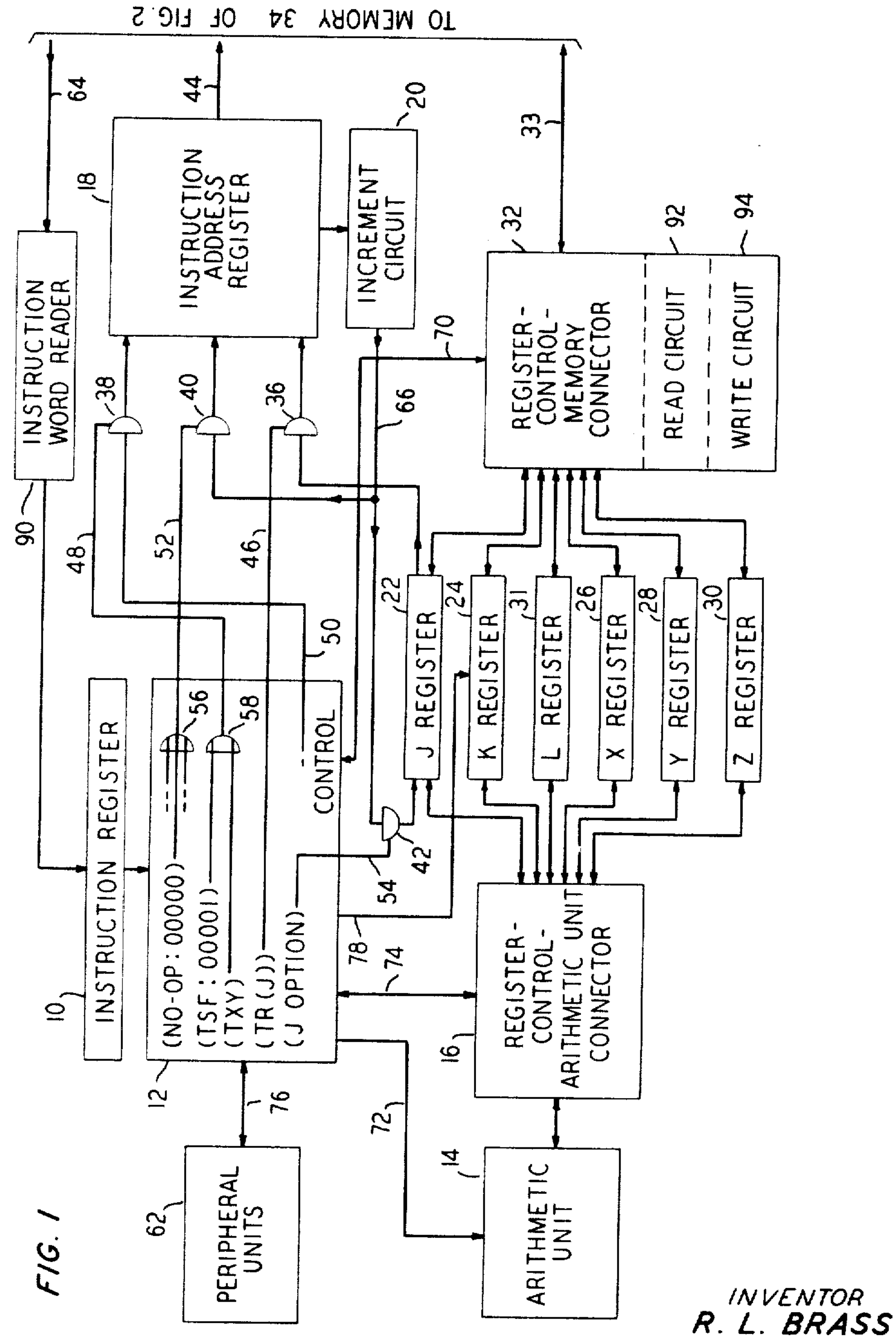

This invention relates to data processors and methods for operation thereof, and more particularly to a method requiring relatively little time to process certain data by the use of two specially designed instructions.

In many data processors it is necessary in each time interval in a repetitive series, e.g., once every 5 milliseconds, to operate on a sequence of groups of data words. Consider for example a data processor which is used to control the operation of a telephone central office. The processor must control the operations of the many peripheral units. To determine the states of the various units, many elements must be scanned. For example, lines must be scanned for service requests. A group of data words in the system memory may be associated with each scan point and the information in any group may be up-dated following each scan. After the information is up-dated, the data processor operates upon it to determine the commands to be transmitted to the peripheral units.

Each group of data words pertains to a different scan point. The group contains not only data which is up-dated but instructions as well. The instructions are often transferred to various subroutines. For example, consider a sequence of 1,000 groups of locations, each associated with a different scan point. During a scanning operation the data in a particular group may be up-dated. At a later time the data in the group is processed. It is impractical to include the instructions of the subroutine which processes the data in the group of locations containing the data because the subroutine would be repeated 1,000 times in memory. It is more convenient to include in each group an instruction to transfer to a single subroutine which controls the processing of the data.

Thus once a transfer out of a main program is made to a group of data and instruction words associated with a scan point, the data having been previously up-dated, the data and instruction words in the group may control a transfer to a subroutine for processing the data. However very often the data in the group will not have been changed since the previous transfer to the group of data and instruction words. In such a case, there may be no need to process the data. The machine returns to the main program which instructs it to transfer once again to another group of memory locations to determine if the data in this group must be processed. The difficulty with such a procedure is that a transfer must be made out of the main program to each group of data and instruction words and another transfer made back to the main program even when the data in the group needs no processing. Not only are two transfers required but in addition the machine must test the data in the group to determine if it has been up-dated since the last examination. Considerable time may thus be wasted; the problem is aggravated when there are relatively few groups containing data which must be processed.

It is a general object of this invention to provide instructions in a data processor and a method for using them such that a minimum amount of time is expended to determine whether the data in a group of memory locations must be processed.

In the illustrative embodiment of the invention, a series or list of instruction words is included in the memory, each of which contains a no-operation (NO–OP) or transfer (TSF) operation code. In most program-controlled machines successively addressed instructions are normally executed in sequence. If an instruction contains a NO–OP operation code, the machine merely skips over it to the next instruction. If an instruction contains a transfer operation code, the machine transfers to the instruction contained in the location whose address follows the operation code in the transfer instruction. Each of the instructions in the list under consideration initially contains a NO–OP operation code followed by a transfer address. The transfer address of the first instruction in the list is the address of the location containing the first word in the first group; the transfer address in the second instruction is the address of the location containing the first word in the second group, etc. Of course, as long as the operation code represents a NO–OP order the transfer address in the instruction is ignored by the machine.

When a particular scan point is scanned to derive data which must be processed, the data is written in the respective group of memory locations. At the same time the respective instruction word in the NO–OP/TSF list is made active, i.e., it is changed so that its operation code now represents a transfer order rather than a NO–OP code. At the beginning of each time interval during which the various groups of data words must be processed, the main program transfers to the first instruction in the NO–OP/TSF list. If no data has been previously stored in the first group of memory locations, the operation code of the first instruction in the list still represents a NO–OP order. The machine merely skips over the first instruction in the list and moves on to the second. Thus the transfer to the first group and the transfer back to the main program are avoided and in addition the data in the group need not be tested to determine if it must be processed. In just one step the machine proceeds to the second instruction in the NO–OP/TSF list. If this instruction also contains a NO–OP operation code, the machine proceeds to the third instruction in the list. Suppose that since the last examination of this instruction, data which must be processed has been written in the third group of memory locations. When the data was written in the group, for example, by a scan program, the operation code in the third instruction in the NO–OP/TSF list was changed from a NO–OP order to a transfer order. When this instruction is now examined, it represents an order to transfer to the instruction contained in the first location in the third group. This instruction in the third group is followed by other instructions and the data which must be processed. The instructions are typically transfer instructions which call for various subroutines to process the data. After the data is processed and perhaps updated, and after commands are tran mitted or at least prepared for transmission to the peripheral units, the machine returns to the fourth instruction in the NO–OP/TSF list. This process continues until the last NO–OP/TSF instruction in the list is examined and a transfer is made to the last group if the operation code represents a transfer order. After the data in the last group is processed, or if a transfer is not made to the last group immediately after the last instruction in the NO–OP/TSF list is examined, a transfer is made back to the main program, the machine having processed the data in each group requiring processing.

One great advantage of my invention is that it is not necessary to transfer from the main program to a group of data and instruction words, to examine the data contained in the group and to then transfer back to the main program if the group contains no information which must be operated upon. By providing the NO–OP/TSF list and examining this list to determine which groups contain data which must be processed, it is possible to effectively "examine" the data in a group by executing a single NO–OP order. As long as the data in a group must be processed the respective instruction in the NO–OP/TSF list is left with a transfer operation code. The data may be processed during a number of succeeding cycles and as long as the processing is not terminated the TSF operation code is left in the respective instruction in the list. Eventually, during one of the time intervals when the various groups of data are processed, the machine determines that no further processing on a particular group is required. For example, if the data represents dial pulse information and the machine determines that all of the required digits have been received, it proceeds to prepare a connection through the telephone switching network. Since the dial pulse information in the group of memory locations has been completely processed, it is no longer necessary to transfer to the group when the successive instructions in the NO–OP/TSF list are subsequently examined. For this reason when the machine, while processing the data in a group, determines that additional processing is not required, it changes the operation code in the respective instruction in the NO–OP/TSF list from a transfer order to a NO–OP order. The next time the instructions in the list are sequentially examined the machine skips over the respective instruction and a transfer is not made to the respective group. During a subsequent scan the machine may detect the origination of another service request. The same group of memory locations may now be assigned to the new call for representing the dial pulse information. Since the data in the group must once again be processed, when the group is initially assigned to the new call the respective instruction in the NO–OP/TSF list is once again changed from a NO–OP order to a TSF order.

Rather than examining each group of data and instruction words when it is time to process the data in the groups, it is only nece sary in my invention to directly execute the respective instruction, a NO–OP or TSF order, in the NO–OP/TSF list. It is necessary, however, to change the instructions in the list. A NO–OP operation code must be changed to a transfer operation code when data to be processed is first written into a group of memory locations. The transfer operation code must be changed back to a NO–OP operation code when it is determined that the data has been completely processed. The time spent in changing the instruction, however, is far less than the time spent, in the prior art arrangements, in examining the groups of data to determine if they must be processed. In accordance with another aspect of my invention, the time spent in changing the operation codes in the NO–OP/TSF list back and forth is reduced to a minimum. In prior art machines, there is no predesigned relationship between the operation codes representing NO–OP and transfer orders. If the method of my invention is utilized in prior art machines, in changing a NO–OP operation code to a transfer operation code and vice versa it may be necessary to change many and perhaps all of the bits in the operation code. In conventional machines, in order to change a data or instruction word in memory it is necessary to first place the word in a register, to change the necessary bits in the register and to then write the new register word in the same location in the memory to replace the old word. Certain prior art machines are equipped with a special instruction which controls a change in only one bit in a special one of the system regi ters. While these machines include instructions which can change any number of bits in a register, the special instruction may be executed in less time since only one bit must be changed. In my invention the operation codes for the NO–OP and transfer orders differ in only one bit. The NO–OP operation code contains all 0's; the TSF operation code contains all 0's except one bit which is a 1. Thus to change the operation code in a word in the NO–OP/TSF list, the word is placed in a special register, which register is the one to be used when the special instruction which controls the modification of a single bit is executed. Each time the operation code must be changed, becau e the two codes differ in only one bit, the special instruction may be utilized for changing the operation code in a minimum amount of time.

It is a feature of this invention to provide in a data processor NO–OP and transfer orders whose operation codes differ by only one bit, and to use this bit in certain instruction words to represent an activity condition.

It is another feature of this invention to provide for a series of groups of data and instruction words, each of which groups may or may not contain data which must be processed, a sequential list of instructions each containing a NO–OP or transfer operation code and each containing a transfer address which is the address of the first location in a respective group of said words.

It is another feature of this invention to change a NO–OP operation code to a transfer operation code, when data to be processed is first written in a group of data and instruction words, in the respective instruction in the NO–OP/TSF list.

It is another feature of this invention to change a transfer operation code to NO–OP operation code, when it is determined that the data in a group has been completely processed, in the respective instruction in the NO–OP/TSF list.

It is still another feature of this invention to execute the instructions in the NO–OP/TSF list when it is time to process the data in groups requiring processing.

Figure 2:
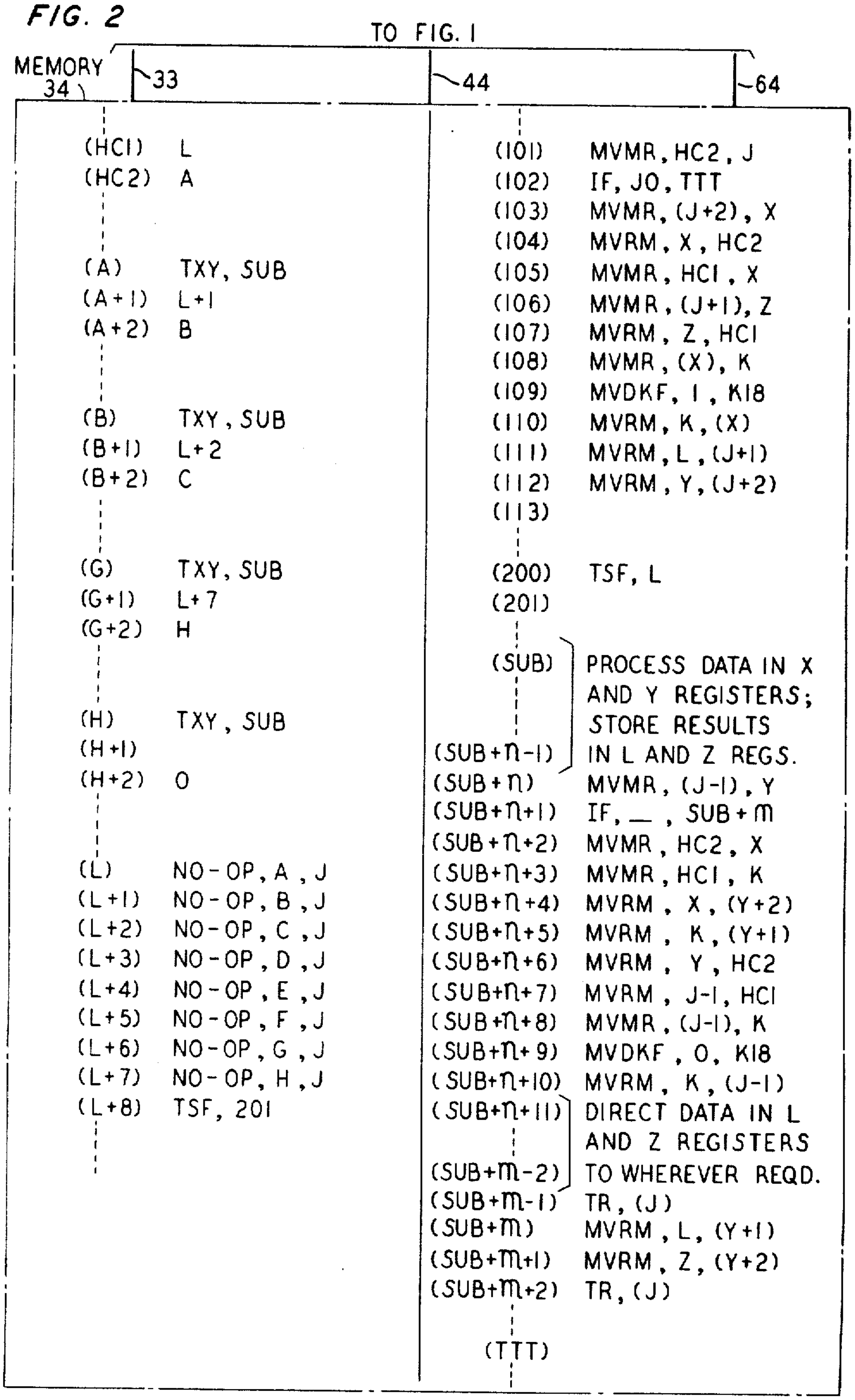

Further objects, features and advantages of the invention will become apparent upon consideration of the following detailed description in conjunction with the drawing in which:

FIG. 1 shows a portion of a stored program data processor in accordance with one illustrative embodiment of my invention; and FIG. 2 shows the memory unit of the processor having an illustrative set of instructions stored therein.

Memory 34, of FIG. 2, contains both the instruction words which control the operation of the data processor as well as the data words which are operated upon. In the drawing various instruction and data words are shown. The address of each of these words is shown in parentheses to the left of the word. (Throughout this description location numbers, or addresses, are shown in parentheses.) The data and instruction words shown in the memory are by no means exhaustive and it is to be understood that the memory contains additional words, the only words shown being those required for an understanding of the invention.

Successively addressed instruction words are transmitted to instruction register 10 by instruction word reader 90. The instructions are interpreted by control 12 which governs the system operation. The address of the next instruction to be transmitted to instruction register 10 is contained in instruction address register 18. The address is transmitted to memory 34 from instruction address register 18 over cable 44. Reader 90 then retrieves the instruction at the respective address over cable 64 and places it in instruction register 10. Increment circuit 20 adds 1 to the number stored in instruction address register 18. The incremented address is applied by increment circuit 20 to cable 66. Gate 40 is normally disabled and the incremented address is not transmitted through this gate to instruction address register 18. When conductor 52 is pulsed, however, the incremented address is transmitted to the instruction address register through gate 40. Thus during normal operation successively addressed instructions are transmitted from memory 34 to instruction register 10.

When a transfer order is executed an out-of-sequence address is stored in instruction address register 18. In executing a (TSF or TXY) transfer order control 12 causes the transfer address to be applied to cable 50 and at the same time causes conductor 48 to be pulsed. The energization of conductor 48 enables gate 38. With gate 38 entabled the transfer address on cable 50 is stored in instruction address register 18. This address is transmitted to memory 34 and it is this address which is thereafter incremented by increment circuit 20.

A J option is available on transfer orders. When a transfer is made from the instruction at a particular address, it is often necessary to subsequently return to the instruction at the succeeding address. For this reason if the J option is used on a transfer order the succeeding address is stored in J register 22. The incremented address appears on cable 66 which is connected to the input of gate 42. When a transfer order is executed conductor 48 is pulsed to enable gate 38, and the transfer address on cable 50 is stored in instruction address register 18. The address on cable 66, however, is the incremented value of the address initially contained in instruction address register 18. If the J option is used, conductor 54 is pulsed, gate 42 is enabled, and the incremented address passes through gate 42 to be stored in J register 22. At a subsequent time when control 12 determines that it is necessary to return to the program at the point from which the transfer was previously effected, conductor 46 is pulsed to enable gate 36. The return address previously stored in J register 22 is transmitted through gate 36 to the instruction address register. It is this address which is thereafter incremented by increment circuit 20.

Within the box, labeled control 12, are various symbolic gates which are only illustrative of the manner in which the circuitry just described may be controlled. When a NO–OP instruction is contained in instruction register 10, the NO–OP operation code being 00000, control 12 causes a pulse to be transmitted through OR gate 56. A pulse may be applied to one of the other inputs of this gate by other parts of the control when other orders are executed, the NO–OP instruction being only one of many which controls the pulsing of OR gate 56. The resulting pulse on conductor 52 controls the transmission of the next instruction address to memory 34. The NO–OP instruction causes no data processing operation to be performed and merely enables the next instruction to be transmitted to instruction register 10.

The ordinary TSF or transfer instruction has an operation code 00001, followed by a transfer address. The address is applied to cable 50. The TSF operation code causes conductor 48 to be energized through OR gate 58 which enables gate 38. The transfer address is transmitted through gate 38 to instruction address register 18. The transfer address is thus inserted in the instruction address register to be sent to memory 34. If the transfer instruction includes the J option, conductor 54 is pulsed. The energization of this conductor enables gate 42. The perviously incremented address on cable 66 is transmitted through gate 42 to J register 22. This return address is stored in the register until it is desired to return to the main program at the point where the initial transfer occurred. The TXY instruction, a variation of the ordinary TSF transfer instruction, also causes OR gate 58 to be energized to effect a similar operation.

The return to the instruction whose address is contained in the J register is controlled by another transfer instruction, designated TR, (J). This instruction controls the energization of conductor 46. With conductor 46 energized, gate 36 is enabled. The return address stored in J register 22 is transmitted through gate 36 to instruction address register 18. This return address is transmitted to memory 34 and a return is made to the main program at the point where the interruption priorly occurred.

The system includes various registers 22, 24, 26, 28, 30 and 31, respectively designated the J, K, X, Y, Z and L registers. In accordance with the instructions interpreted by control 12 signals are transmitted between the control and register-control-memory connector 32 over cable 70. Register-control-memory connector 32 controls the transfer of data between memory 34 and the system registers. The connector includes a read circuit 92 for reading data words out of the memory and a write circuit 94 for writing data words into the memory. Arithmetic operations are performed in arithmetic unit 14, this unit operating in accordance with signals received from control 12 over cable 72. Signals are also transmitted back and forth between control 12 and register-control-arithmetic unit connector 16 over cable 74. In accordance with the signals transmitted over cable 74, selected register words are transferred from the system registers to arithmetic unit 14 where they are processed in accordance with the command signals on cable 72. Data derived by arithmetic unit 14 is transmitted through register-control-arithmetic unit connector 16 to be stored in selected ones of the system registers. The results of the operation performed by the arithmetic unit may be sent to control 12 over cable 74. In accordance with the signals transmitted to control 12 over cable 74 and in accordance with orders contained in the instruction word in register 10 commands are transmitted back and forth over cable 76 between the control and the peripheral units 62. The peripheral units include input/output equipment and any other equipments controlled by the system.

In order to change a word stored in memory 34, it is first transmitted through register-control-memory connector 32 to one of the system registers. It is then transmitted through register-control-arithmetic unit connector 16 to arithmetic unit 14. In accordance with command signals on cable 72, the word may be changed or completely rewritten. It then is transmitted through connector 16, a register and connector 32 to memory 34 where it is stored in the initial location. If it is desired to change only one bit in the word, however, a special order is provided which requires less time to execute. The word is stored in K register 24. A command is sent from control 12 over cable 78 directly to the register. This command specifies both the register stage which is to be written into and the value of the bit. The modified word is then sent back through connector 32 and stored in memory 34. This operation is relatively fast because it is not necessary to transmit the word to be changed to arithmetic unit 14 since the change may be made directly in register 24. The K register, like the J register, may be used in the same manner as the other registers but is also used for a special purpose.

The following is a list of typical instructions which may be executed in the machine which types of instructions must be understood to appreciate the illustrative embodiment of the invention.

(1) MVMR, A, X: This order controls a read-out from the memory and the placing of the word read out in a specified register. Following the operation code MVMR, is an address which specifies the location in the memory whose content is to be read. In the example given a word is read out of location A. Following the address is a letter which specifies one of the system registers. In the example selected, the word in location A is read into the X register.

(2) MVMR, $(J-1)$, X: This order also controls a read-out from the memory and the placing of the word read out in the specified register, in this case the X register. The address of the location in memory whose content is read is not stated explicitly. Instead the machine examines the J register and subtracts 1 from the number stored in it. Thus if the J register contains the number 200 the data word at address 199 in the memory is read into the X register. If the term $(Y+2)$ is contained in the instruction rather than the term $(J-1)$, and the Y register contains the number 688, the word at address 690 is read out of the memory. An address in the memory is specified by 15 bits. A register may contain up to 23 bits but only the rightmost 15 bits are used to derive the effective address of the word to be read out of the memory. The actual coding of each instruction word does not follow the symbolic coding. The 15 least significant bits of every instruction contain a data-address field even though in the symbolic coding the data or the address may appear somewhere in the middle of the instruction. Suppose for example that the entire instruction MVMR, 690, X is placed in the J register, i.e., it is to be treated as data. The address 690 occupies the 15 least significant stages in the register. Consequently if the order MVMR, $(J-1)$, K is executed, the word stored in the memory at address 689 is read into the K register.

(3) MVRM, K, A: This instruction is the converse of the first. A register word is stored in a memory location. The first letter following the operation code specifies the register. Following the register specification is an address. In the example given, the word in register K is written into location A in the memory.

(4) MVRM, K, $(Y+2)$: This instruction also controls the storage of the word in the K register in the memory. The address of the location in the memory is determined by examining the Y register. The number 2 is added to the content of the Y register to derive the effective storage address. Thus, if the Y register contains the number 800 the word in the K register is stored at address 802 in the memory. Again, only the rightmost 15 bits in the specified register are considered in the derivation of the effective address.

(5) MVDKF, 1, K18: This is an order which controls the writing of one bit in the K register. The number following the operation code is either a 0 or a 1 and represents the value of the bit to be written in the K register. Following this bit value is one of the symbols K0 through K22. Each memory word comprises 23 bits and the K register contains 23 steps. The symbol K18, for example, specifies stage 18 in the K register. Thus in the selected example a 1 is written in stage 18 of the K register.

(6) IF, ____, 200: The IF instruction causes a test to be performed, and in accordance with the result of the test either the next instruction is executed or a tarnsfer is made to the instruction at a specified address. Various tests are possible and for an understanding of the invention it is not necessary to consider any one in particular. For this reason the test specified in the selected example is left blank. If the test produces a first result the machine proceeds to the succeeding instruction. If the test produces a second result the machine transfers to the instruction at the specified address, in the selected example address 200.

(7) NO–OP, A: If an instruction contains a NO–OP operation code the address following the code is ignored. No data processing operations are performed and the machine merely proceeds to the next instruction.

(8) TSF, A, J: The TSF operation code causes the machine to transfer to the instruction at the specified address, address A in the selected example. The symbol J is included in the instruction (and in the tenth instruction, TXY) only if it is desired to utilize the J option. In such a case, the address of the next instruction, which is not executed since a transfer is being made, is stored in the J register.

9) TR, (J): When it is desired to return to the instruction whose address is contained in the J register, this second type of transfer instruction is used. This instruction causes a return to the instruction at the address previously stored in the J register.

(10) TXY, SUB: This instruction is similar to the TSF instruction. A transfer is made to the instruction stored at address SUB. In addition, the two words stored in the two locations immediately following the location containing the TXY instructions itself are stored in registers X and Y respectively. This instruction is provided in order that data be available in the machine registers when a tarnsfer is made to a subroutine.

Memory 34 includes a series of work lists. Only eight are shown in the illustrative embodiment of the invention. Each work list contains three words. The first work list is stored at addresses (A) through $(A+2)$, and the first word in the list is an instruction TXY, SUB. Similarly, the second work list is stored at addresses (B) through $(B+2)$ and the first word in the list contains the same instruction TXY, SUB. Similar remarks apply to the other six work lists. Initially, when the machine is first put into operation, data is contained in the second and third locations of each list. The word stored in the third location of each list is the address of the first location in the next list. Thus the third word at address $(A+2)$ is B, the word stored at address $(B+2)$ is C, et cetera. Since there are only eight work lists the third word in the eighth work list, stored at address $(H+2)$, is O. When data is first written into a work list it is written into the second and third locations of the list. The word in the third location in each work list is thus erased. This initial word in each inactive work list (an inactive work list is one which contains no data to be processed) is used for selecting an idle work list when data is to be first written in a list. Once the list is selected the third word initially in the list need not be retained.

A work location file is contained at addresses (L) through $(L+7)$. When the machine is first put into operation a NO–OP instruction is stored at each address in the work location file, as shown in the drawing. The work location file is used to identify the location of any work list whose data must be processed. The second word initially contained in each work list is an address of a respective location in the work location file. When data is written into a work list this address is erased. The address is required however only when the work list is first selected and need not be retained once the list is activated.

*Selection of a work list for entry of data*

Before proceeding with a description of the illustrative program it will be helpful to understand the manner in which a work list is selected. In the course of the machine operation two data words are derived in registers L and Y, which data words must be processed. One of these data words for example might represent the identity of a trunk in a telephone switching system and the other might represent the state of the trunk. The processing of the data might involve the scanning of the trunk for a predetermined time interval to detect a change of state. An idle work list is selected and the two data words, in the L and Y registers, are stored in the second and third locations of the list. The list is made active. At a subsequent time the machine processes the data in all active work lists. Thus in order to write data in a work list it is necessary to maintain a record of idle lists, to choose one of them, and to change the record to indicate that it is no longer idle. One technique which may be used to select an idle work list is to maintain a "directory" or a record of each list with its active or inactive state, and to examine the record to find an inactive work list when one must be selected. This technique however requires considerable processing time. For this reason a far more efficient procedure is utilized in the invention.

Only one extra location in the memory, location (HC2) is required in order to select an idle work list. When the machine is first put into operation location (HC2) contains the address of the first location in the first work list, address (A). Whenever a work list is to be seized location (HC2) is examined. Unless it contains a O the number in it represents the identity of the idle work list to be selected. When the idle list is selected the address stored in its third location is written into location (HC2).

Initially all work lists are idle and all locations in the memory contain the data and instruction words shown in the drawing. The first time it is necessary to select an idle work list location (HC2) is examined. Since the number A is stored at this location the machine is instructed to select the first work list for storing the data to be processed later. The data is stored at addresses $(A+1)$ and $(A+2)$. Since location $(A+2)$ initially contains the number B, this number is stored at address (HC2).

If the first work list does not become inactive, i.e., if its data is not completely processed, by the time it is necessary to select a second work list, the work list at locations (B) through $(B+2)$ is chosen. Since the machine examines location (HC2) to select an idle list and since the number B has been stored previously at this address, the list beginning at location (B) is selected. The third word in the list, C, is then stored in location (HC2). Thus the next time a work list must be selected and location (HC2) is examined, the third work list is chosen.

*Release of work list*

When the processing program determines that the data in a work list has been completely processed the list is made inactive. This is accomplished as follows. The number stored in location (HC2) is written into the third location of the now idle work list, and the address of the first location in the now idle work list is written into location (HC2). The next work list to be selected, unless another work list becomes idle, is the one which just became idle. The essence of this technique is that the third word in each idle work list identifies another idle work list. The content of location (HC2) also identifies an idle work list. When a list becomes idle the identity of the list is placed in location (HC2). Location (HC2) previously contained the identity of an idle list. In order to retain this record the list identity is stored in the third word of the list which just became inactive. Thus while initially the lists are identified in the sequence A, B . . . H, in the course of the machine operation the chain may be changed. Suppose, for example, that the last work list to become idle is one beginning at location (E) and consequently location (HC2) contains the number E. Suppose that the next to last list which became idle is the one beginning at location (B). Since location (HC2) contained the number B when the list beginning with location (E) became idle, when address (E) was stored in location (HC2), the content of this location, B, was stored at address $(E+2)$. Suppose further that the other six lists are active. Assume now that the work list beginning at location (G) becomes idle. Address (G) is now stored in location (HC2) and the number E previously contained in this location is stored at address $(G+2)$. Thus the next work list to be seized is that beginning with location (G) followed by the selection of the list beginning at location (E), which in turn is followed by the selection of the list beginning with location (B).

The eighth work list is not selected until the other seven are all in use. When the eighth list is selected since it contains the number O at address $(H+2)$, the number O is stored at address (HC2). If an attempt is now made to seize another work list by examining location (HC2) the address identified is O. This is an indication to the machine that there are no more idle lists and that a transfer should be made to a trouble subroutine. Suppose however, that before an attempt is made to seize a ninth work list one of the eight work lists becomes idle. If the list which becomes idle is that beginning with location (D), the number D is stored at address (HC2) and the O previously contained at this address is stored at address $(D+2)$. The next work list to be seized is the fourth and the O which is written once again in location (HC2) indicates that all work lists are in use. However suppose that after work list D becomes idle and before another work list is selected, work list A becomes idle. In such a case the number A is stored at address (HC2) and the number D previously stored at this address is stored in location $(A+2)$. Since the next list to be selected is the one beginning with location (A), and the list after this which is selected will be the one beginning with location (D) it is seen that the O in location $(D+2)$ will not move into location (HC2) until both idle work lists are seized. In general, because work lists are selected in an order reverse to that in which they become idle, the O initially in location $(H+2)$ does not appear in location (HC2) unless all eight work lists are active.

*Updating of HC1 and HC2*

It will be recalled that when data is written into a work list the respective entry in the work location file is changed from a NO-OP order to a transfer order. Location (HC2) contains the identity of the work list which is to be selected next. Since there is no correspondence between the locations comprising a work list and the address of the respective work location file entry, a second record must be kept in order that the instruction in the work location file be changed when the respective work list is seized. Location (HC1) is used for storing the address of the work location file entry associated with the work list to be seized next. Thus initially since location (HC2) contains address (A), location (HC1) contains address (L). When the first work list is seized the number B is written into location (HC2). At the same time the number $L+1$ (stored at address $(A+1)$, is transferred to location (HC1). Thus after the first work list is made active the content of location (HC2) identifies the B work list and the content of location (HC1) identifies the respective work location file entry at address $(L+1)$. In this manner the proper work location file entry is always represented in location (HC1) when the respective work list is represented in location (HC2). When a work list becomes idle it will be recalled that the address of its first location is stored in location (HC2). As will be seen below at the same time the address of the respective work location file entry is stored at address (HC1). The work list identity originally in location (HC2) is stored in the third location of the work list which has just become idle. In a similar manner the work location file address originally in location (HC1) is stored in the second location in the same work list.

*Selection of a work list; changing operation code in work location file*

With these preliminary remarks the program may now be examined. As the machine executes successively addressed instructions it determines that two data words must be processed. The words appear in registers L and Y. The machine transfers to the instructions at address (101) to select an idle work list and to store the two data words in is second and third locations. The first instruction executed is MVRM, HC2, J. This instruction causes the address stored in location (HC2) to be written into the J register. The next instruction executed is IF, JO, TTT. If the number in the J register is O all eight work lists are in use and a transfer is made to a trouble subroutine whose first instruction is stored at address (TTT). The nature of this subroutine is not essential for an understanding of my invention. On the other hand, if there is yet an idle work list the machine proceeds to execute the instruction at address (103). Suppose location (HC2) originally contains adress (B). Consequently the number B is stored in the J register when the instruction at address (101) is executed. The instruction at address (103) is MVRM, $(J+2)$, X. This instruction causes the data word in location $(B+2)$ to be written into the X register. Suppose the number stored in location $(B+2)$ is at this time F. Consequently the number F is placed in the X register. This number, the address of the first location in the next work list to be seletced, must be placed in location (HC2). This is accomplished by the next instruction MVRM, X, HC2.

Since address F is placed in location (HC2) it is necessary that the address of the respective work location file entry, $(L+5)$, be placed in location (HC1). First, the previous content of location (HC1), the address of the work location file entry associated with work list B, is placed in the X register to save it. Since location (HC2) originally contained the number B, location (HC1) initially contains address $(L+1)$, and when the first instruction—MVRM, HC1, X—is executed the number $(L+1)$ is placed in the X register. (The number F previously placed in the X register when the instruction at address (103) was executed is erased, but this number is no longer required.) The sixth instruction causes the new work location file address to be placed in the Z register. When the instruction at address (101) was executed the number B was placed in the J register. Consequently the sixth instruction—MVRM, $(J+1)$, Z—causes the content of location $(B+1)$ to be placed in the Z register. Location $(B+1)$ initially contains address $(L+5)$, the work location file adress associated with work list F whose identi'y is initially in location $(B+2)$. The seventh instruction executed—MVRM, Z, HC1—causes the work location file address associated with work list F, address $(L+5)$, to be placed in location (HC1) as desired.

At this point locations (HC1) and (HC2) both contain the proper addresses, that is, the addresses identifying the next work list and the respective work location file entry to be selected. Since work list B has now been seized it is necessary to change the respective entry in the work location file to indicate that the data in this work list must be processed. This entry is at address $(L+1)$, this address having been placed in the X register during the execution of the instruction at address (105). The eighth instruction—MVRM, (X), K—causes the word at address $(L+1)$ to be placed in the K register. The five most significant bits in this word are all 0's since the work location file entry at address $(L+1)$ originally contains a NO–OP code to indicate that there is no data in work list B to be processed. The ninth instruction executed—MVRM, 1, K18—causes a 1 to be written in the 18th stage of the K register, changing the operation code from 00000 to 00001. In the tenth step the order MVRM, K, (X) is executed. The content of the K register is stored in the memory at the address contained in the X register, i.e., at address $(L+1)$. The B work location file entry has thus been up-dated as required.

Since all necessary bookkeeping operations have been performed the machine now writes the two data words previously derived and contained in registers L and Y in the second and third locations in the B work list. Register J contains the number B, this number having been transferred from location (HC2) to the register when the instruction at address (101) was executed. When the eleventh instruction—MVRM, L, $(J+1)$—is executed the data word in the L register is stored at location $(B+1)$. When the twelfth instruction—MVRM, Y, $(J+2)$—is executed the data word in the Y register is stored at address $(B+2)$. The machine proceeds to execute the instructions beginning with that stored at address (113). The program may include a variety of loops by which the instructions at addresses (101) through (112) may be executed again and again as new pairs of data words which must be processed are derived. As each pair of data words is derived the words are stored in the second and third locations in an idle work list and the record of available work lists is up-dated.

*Processing work lists; reading work location file operation codes*

At some time in the course of the program it becomes necessary to process the data contained in active work lists. At this time the instruction at address (200) is executed. This instruction—TSF, L—controls a transfer to the first instruction in the work location file. Suppose work list A is idle. Since it contains no data which must be processed the instruction at address L represents a NO–OP order. The machine proceeds to examine the instruction at address $(L+1)$. If work list B similarly contains no data to be processed location $(L+1)$ also contains a NO–OP order. The machine proceeds to the third work location file instruction. Suppose work list C does contain data to be processed. When the data was first written in the work list, the respective work location file entry at address $(L+2)$ was changed from representing a NO–OP order to the instruction TSF, C, J. This instruction causes a transfer to be made to the instruction contained to address (C). Because the J option is included in the instruction the address of the next instruction, $(L+3)$, is stored in the J register. Address $(L+3)$ must be stored in the J register in order that the machine return to the next work location file entry after the data in work list C is processed.

The instruction contained at address (C), the one to which the machine transfers, is TXY, SUB. This instruction causes the machine to place the two data words, previously stored in locations $(C+1)$ and $(C+2)$ in the X and Y registers, and to transfer to the instruction at address SUB. Each work list begins with a transfer instruction in order that the same subroutine be used to process the data in each list. The instructions at addresses (SUB) through $(SUB+n-1)$ control the processing of the data. The final results are stored in the L and Z registers. The details of the processing program are not essential to an understanding of my invention.

Before any pair of data words is completely processed the processing subroutine may have to be executed a number of times. For example, if the two data words represent the identity of a trunk in a telephone switching system and the state of the trunk, and the processing program controls the scanning of the trunk to detect a change of state, a number of scans may have to be performed in succession before a final result is determined. For this reason the instruction at address $(SUB+n+1)$ controls a test, the details of which are also not essential to an understanding of my invention. If the test indicates that the data has been completely processed the machine proceeds to the next instruction. If the test indicates that more processing is required the machine transfers to the instruction at address $(SUB+m)$ to restore the data in the same work list. No matter which path the machine takes following the test it must know the identity of the work list from which the initial two data words were retrieved. For this reason before the test is performed the instruction at address $(SUB+n)$ is executed. This instruction causes the address of the first location in the work list to be stored in the Y register.

It will be recalled that the TSF instruction at address $(L+2)$ includes the J option. Consequently when the machine transferred to the instruction at address (C) the address $(L+3)$ was stored in the J register. The TXY transfer instruction at address (C) does not include the J option and consequently when the machine transfers to the processing subroutine address (L+3) is still retained in the J register. Thus when the instruction at address $(SUB+n)$ is executed, this instruction being MVMR, $(J-1)$, Y, the machine examines the address in the J register and subtracts 1 from it (without actually changing the contents of the J register). The data word stored at this modified address $(L+2)$, is sent to the Y register. The word stored at address $(L+2)$ is the instruction word TSF, C, J. This word is treated as data and sent to the Y register. As described above the 15 least significant bits of an instruction always contain the address specified in the instruction. Consequently the number C comprises the 15 least significant bits at address $(L+2)$ and therefore now these bits are placed in the 15 least significant stages in the Y register. This number, C, identifies the particular work list to which the data in the L and Z registers must be returned.

Suppose the test controlled by the instruction at address $(SUB+n+1)$ determines that the processing of the data is not complete. The machine transfers to the instruction at address $(SUB+m)$. The instruction—MVRM, L, $(Y+1)$—tells the machine to store the L register data word in the memory at the location whose address is equal to the sum of the content of the Y register and 1. Since the number C is contained in the first 15 stages of the Y register the L register data word is sent back to the C work list and stored at address $(C+1)$. In a similar manner when the next order—MVRM, Z, $(Y+2)$—is executed the second data word, contained in the Z register, is stored in location $(C+2)$. Since the data in the C work list has been processed the machine must return to the work location file to determine if the data in the D work list must be processed. The next instruction executed is TR, (J). The J register still has in it the address $(L+3)$. This instruction causes the machine to return to the instruction which is the fourth entry in the work location file. This instruction contains either a NO–OP or TSF operation code depending on whether the D work list is active. If it is, address $(L+4)$ is stored in the J register and the machine transfers to the instruction at address (D). This instruction—TXY, SUB—similarly controls a transfer to the processing subroutine. This sequence continues until the data in all active work lists are processed.

*Release of a work list; changing operation code in work location file*

Returning now to the processing program suppose the test controlled by the instruction at address $(SUB+n+1)$ reveals that the data contained in the L and Z registers has been completely processed. In such a case this data must be directed to specified storage locations in memory or to the peripheral units. In addition, certain bookkeeping operations must be performed, specifically, the work list initially containing the data which was processed must be deactivated. This last function is accomplished by the instructions at addresses $(SUB+n+2)$ through $$(SUB+n+10)$$

The MVMR, HC2, X instruction causes the address stored in location (HC2) to be placed in the X register. This address, which identifies the idle work list which would have been selected next and had the C work list not just become idle, must be stored in location $(C+2)$. The address is first put in the X register. The address of the respective work location file entry must be stored in location $(C+1)$. This address is first put in the K register with the execution of the order MVMR, HC1, K.

It will be recalled that when the instruction at address $(SUB+n)$ was executed the TSF, C, J instruction at address $(L+2)$ was stored in the Y register, the 15 least significant bits in this register representing the number C. The instruction at address $(SUB+n+4)$ is MVRM, X, $(Y+2)$. This instruction causes the content of the X register, which represents the idle work list identity previously contained in location (HC2), to be stored at address $(C+2)$; the next instruction—MVRM, K, $(Y+1)$—causes the content of register K, which represents the respective work location file entry previously contained in location (HC1), to be stored at address $(C+1)$. The two instructions at addresses $(SUB+n+4)$ and $(SUB+n+5)$ control the up-dating or the work list just made idle, that is, the placing in the second and third locations in this work list of the identities of the idle work list and the respective work location file entry previously contained in locations (HC1) and (HC2).

It is now necessary to place in location (HC2) the address of the first location in the work list which has just become idle, work list C, and to place in location (HC1) the address of the respective entry in the work location file, address $(L+2)$. The Y register contains the word TSF, C, J. When the instruction MVRM, Y, HC2 is executed this entire word is stored in location (HC2). The 15 least significant bits represent the number C. Although eight additional bits are stored in location (HC2), which bits are not required to identfy the C work list, these bits are in the eight most significant positions in the storage location. Since the content of location (HC2) is used only to identify an idle work list when data is first stored in a work list, only the 15 least significant bits are examined and consequently the eight most significant bits now stored in location (HC2) do not enter subsequent computations.

The next instruction which is executed is MVRM, $J-1$, HC1. The J register still contains address $(L+3)$. Address $(L+2)$ is stored in location (HC1) to identify the third entry in the work location file to go along with the identity of work list C in location (HC2). At this point in the processing program the up-dated entries have been stored in the second and third locations of the work list which has just become idle and in locations (HC1) and (HC2). The only remaining operation required is the up-dating of the entry in the work location file at address $(L+2)$ to indicate that the work list is idle in order that the processing program skip over this instruction in subsequent cycles. The entry at address $(L+2)$ is changed from a TSF instruction to a NO–OP instruction by the next three instructions in the processing program. The J register still contains address $(L+3)$. When instruction MVMR, $(J-1)$, K is executed the content of location $(L+2)$ is placed in the K register. This instruction must be changed to represent a NO–OP order. When instruction MVDKF, O, K18 is executed the bit in stage 18 of the K register is changed from a 1 to a 0, i.e., the five most significant bits in the register now represent a NO–OP operation code rather than a transfer operation code. When the instruction at address $(SUB+n+10)$ is executed, the instruction being MVRM, K, $(J-1)$, the K register word is returned to location $(L+2)$. In subsequent executions of the processing program the NO–OP order at address $(L+2)$ will cause the machine to go on directly to the examination of the fourth work location file entry.

All bookkeeping operations have now been completed. The L and Z registers contain the processed data which must be directed to either the peripheral units, the control, or stored in the memory depending on the nature of the data and the processing program itself. The instructions between address $(SUB+n+11)$ and $(SUB+m-2)$ direct the data to wherever it is required, the particular instructions not being essential to an understanding of the invention. The next instruction which is executed is TR, (J). The J register contains address $(L+3)$ and the machine proceeds to examine the work location file entry which is associated with work list D to determine if there is any data in this work list to be processed.

The eight entries in the work location file are sequentially examined and a transfer is made to the processing program whenever an entry indicates that the respective work list contains data which must be processed. The last entry examined is that at address ($L+7$). If the work location file represents a transfer order a transfer is made to the address (H) followed by a transfer to the processing program. A return is then made to the instruction at address ($L+8$). If the instruction at address ($L+7$) contains a NO–OP operation code the machine goes immediately to the instruction at address ($L+8$). The instruction at this address is TSF, 201. This instruction causes the machine to transfer to the instruction at address (201). It will be recalled that the machine first executes the program which controls the writing of data in the work lists. When it is time to process this data the instruction at address (200) is executed to control the sequential examination of the work location file entries. After these entries have been examined and the data has been processed a return is made to the instruction at address (201) in order that the machine continue executing the instructions following the point in the program where the transfer to the work location file was effected.

Although the invention has been described with reference to a particular embodiment it is to be understood that this embodiment is only illustrative of the application of the principles of the invention, and that numerous modifications may be made therein and other arrangements may be devised without departing from the spirit and scope of the invention.

What is claimed is:

1. A data processor comprising:

a memory for storing instruction and data words at respective addresses;

means for controlling the execution of successively addressed instructions;

means responsive to a transfer instruction, a first part of which represents an operation code and a second part of which represents a transfer address, for controlling the execution of the instruction stored at said transfer address;

and means responsive to a no-operation instruction, a first part of which represents an operation code identical to the operation code of said transfer instruction except for one bit, for preventing the manipulation of data in the data processor.

2. A data processor in accordance with claim 1 further including means responsive to a predetermined instruction for changing a single bit in data and instruction words.

3. A data processor in accordance with claim 1 wherein said memory includes a plurality of groups of locations, some of said groups containing data words to be processed, and a series of instruction words each having a transfer address identifying a respective one of said groups and each having a no-operation operation code if the respective group contains no data to be processed and a transfer operation code if the respective group contains data to be processed.

4. A data processor in accordance with claim 1 wherein said memory includes a plurality of groups of locations, some of said groups containing data to be processed, and an instruction word associated with each of said groups containing either a no-operation or a transfer operation code depending on whether the data in said each group is to be processed.

5. A data processor in accordance with claim 3 wherein said means responsive to said no-operation instruction includes means controlled by said no-operation code portion of said no-operation instruction for incrementing said means for controlling the execution of successively addressed instructions to the instruction word next successive to said no-operation instruction in said series of instruction words.

6. A data processor in accordance with claim 3 wherein said means responsive to said transfer instruction includes means controlled by said transfer operation code portion of said transfer instruction for advancing said means for controlling the execution of successively addressed instructions to the address indicated in the transfer address portion of said transfer instruction.

7. A data processor in accordance with claim 3 wherein said series of instruction words are stored in successive locations in said memory, said processor further including means for changing a single bit in one word of said series of instruction words, said single bit changing means changing said operation code portion of a no-operation instruction into a transfer code when data is entered in the group of locations respective to said one word and changing said operation code portion of a transfer instruction into a no-operation code when there is no more data to be processed in said group of locations respective to said one word.

No references cited.

PAUL J. HENON, *Primary Examiner.*

R. ZACHE, *Assistant Examiner.*